Figure 1:
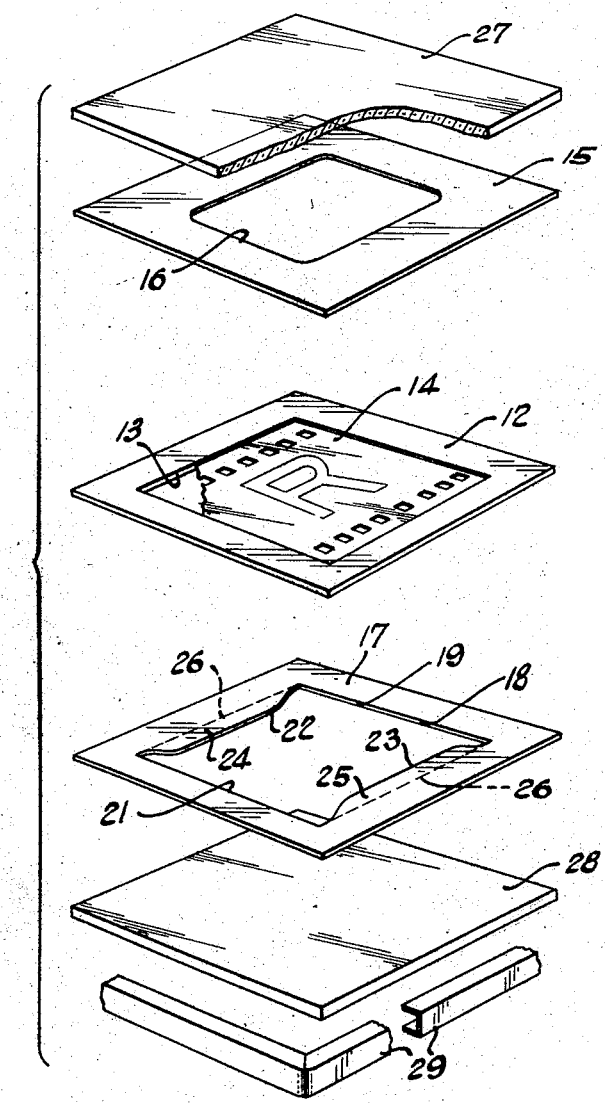

Nov. 25, 1958  A. J. ROSENBERG  2,861,368

FILM MOUNT

Filed Jan. 4, 1956

United States Patent Office 2,861,368
Patented Nov. 25, 1958

2,861,368

FILM MOUNT

Arthur J. Rosenberg, New York, N. Y.

Application January 4, 1956, Serial No. 557,396

6 Claims. (Cl. 40—158)

This invention relates to a film mount and relates more particularly to a film mount especially adapted for use in producing slides.

According to one method for producing slides, a rectangular strip of film carrying an image, usually a piece of motion picture film, is placed in a mount between a pair of transparent cover plates, normally of glass. The plates are then fastened together, for example, by binding their edges with a strip of gummed tape. The slide so produced should hold the film strip accurately positioned with respect to the surfaces and edges of the slide. In addition, the slide should include a mask for precisely defining the area of the image. The slide should also be simple and inexpensive to produce and assemble so that its cost may be held to a minimum.

It is an important object of this invention to provide a film mount which will meet all of the foregoing requirements in producing slides.

A further object of this invention is to provide a novel film mount which is simple and inexpensive to manufacture and into which a film strip may be readily inserted with a minimum of effort.

Another object of this invention is to provide a film mount which will hold a film strip accurately positioned in a slide and which will define precisely the area of the image.

Other objects of this invention will be apparent from the following detailed description and claims.

According to the present invention, there is provided a film mount comprising three superimposed layers of material. The center layer of material has an opening therein of a size into which the film strip fits closely. One of the outer layers, hereinafter referred to as the top layer, is opaque and has an opening therein of a size smaller than that of the opening in the central layer and which is dimensioned and positioned precisely to mask off all but the desired image area when the film strip is fitted into the opening of the center layer. The other outer layer, hereinafter referred to as the bottom layer, also has an opening therein with two of its opposed sides spaced apart a distance at least equal and, preferably, equal to the spacing between the corresponding opposed sides of the opening in the center layer. The other two opposed sides of the opening in the bottom layer are spaced apart, preferably only over their central portions, a distance less than that of the corresponding sides of the opening in the center layer but at least equal to or, preferably, greater than that of the sides of the opening in the top layer to form flaps that cooperate with the top layer to hold the film strip therebetween. The center layer is secured, as by the use of an adhesive or the like, throughout its entire area to the top and bottom layers. In a preferred embodiment of this invention, the three layers are made of paper which is cut to the desired size and shape. The outside dimensions of at least one and, preferably, all three layers of the film mount are made substantially equal to those of the cover plates between which it will be positioned so that it may be readily aligned accurately with respect to said cover plates.

To position the film strip in the film mount, one edge of the film strip is inserted between the top layer and one of the flaps in the bottom layer with the sides transverse to said edge aligned with the sides of the opening in the center layer. The film strip is then bent along a line parallel to its said edge until its opposed edge may be placed between the top layer and the other flap in the bottom layer. Thereafter, the film strip is released and its resilience will cause it to flatten out. At this time, the film strip will be positioned between the top and bottom layers with its edges in abutment with the edges of the opening in the center layer thereby accurately positioning the said film strip. The top layer of the mount will mask off all but the desired image area while the flaps in the bottom layer will hold the film strip in place. The mount carrying the film strip is then placed between the cover plates and the edges of the said cover plates are bound together with a gummed tape or the like.

The film mount of this invention not only serves to hold the film strip accurately in place, but it is inexpensive to manufacture. In addition, there is a minimum of labor involved in inserting the film strip therein and in assembling the mounted film strip to form a slide.

Figure 2:
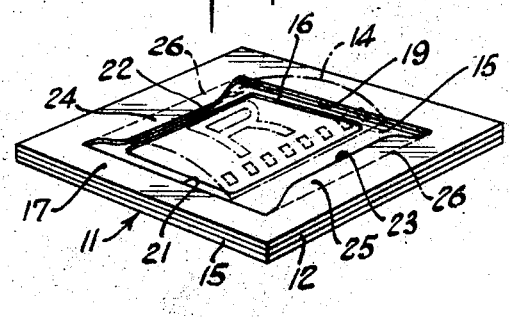

A preferred embodiment of this invention is shown in the accompanying drawing wherein Fig. 1 is an exploded perspective view of the slide, and Fig. 2 is a perspective view of the film mount shown in an inverted position in the interests of clarity.

Referring now to the drawing, the reference numeral 11 designates generally a film mount comprising a center layer 12 having an opening 13 therein of a size into which a film strip 14, shown as a piece of motion picture film, fits closely. A top layer 15 having a masking opening 16 therein is secured to one side of the center layer. The opening 16 is dimensioned to mask off all but the desired image area. Secured to the other side of the center layer 12 is a bottom layer 17 having an opening 18 therein. The edges 19 and 21 of the opening 18 are spaced apart a distance preferably equal to the distance between the corresponding edges of the opening 13. In this way, in the event the film strip 14 is slightly cupped and a portion of its edges project out of the plane of the center layer 12, the said edges of the film strip will abut the edges 19 and 21, thereby to keep the film strip from shifting. The central portion of the other two edges 22 and 23 of the opening 18 are spaced apart a distance less than the distance between the corresponding edges of the opening 13, but more than the distance between the corresponding edges in the opening 16 to form flaps 24 and 25. The ends of the edges 22 and 23 are spaced apart a distance equal to the spacing between the corresponding edges of the opening 13. With this arrangement, as shown in Fig. 2 of the drawing, a portion of the inner surface of the top layer 15 adjacent the opening 16 is exposed. The lines 26 indicate the inner limits of the area of the layer 17 that is secured to the layer 12.

When a film strip 14 is to be inserted in the mount 11, one edge of the said film strip is inserted, for example, under the flap 24 with its transverse edges aligned with the edges 19 and 21. During this operation, the exposed inner surface of the top layer 15 acts as a guide whereby the movement of the film strip under the said flap may be readily carried out. In addition, because the flap 24 extends over only the central portion of the edge 22, no difficulty is experienced in shifting the film strip 14 until its transverse edges are properly aligned. To permit such shifting the flap should extend over from 20 to 90%, or, preferably, from 40 to 75% of the said edge. The film strip 14 is then bent as shown in Fig. 2 of the drawings until its edge can be slipped under the flap 25. During this operation, the exposed inner surface of the top layer 15 again acts as a guide to direct the film under the flap 25. The film is then released and its resilience will flatten it to the position shown in Fig. 1.

The film mount 11 is then placed between cover plates 27 and 28 whose outer dimensions are equal to those of the outer dimensions of the said mount. Then, the edges of the whole assembly are bound together with a gummed tape 29 in a manner well known in the art.

Having described my invention, what I desire to secure by Letters Patent is:

1. A film mount for carrying a film strip comprising a center layer having an opening therein into which the film strip fits closely, a top layer secured to said center layer and having an opening therein smaller than the opening in the center layer whereby the inner surface of the top layer is exposed adjacent the opening in the center layer, the opening in the top layer being dimensioned and positioned precisely to mask off all but the desired image area in the film strip when the film strip is fitted into the opening in the center layer, and a bottom layer secured to said center layer and having an opening therein, the opening in said bottom layer having two of its opposed edges spaced apart a distance at least equal to the spacing in the corresponding edges in the opening in the center layer whereby the exposed inner surface of the top layer adjacent the opening in the center layer at said two edges remains exposed to act as a guide for the insertion of the film strip, and having its other two opposed edges spaced apart a distance less than the spacing between the corresponding edges in the opening in the center layer but greater than the spacing between the edges in the opening in the top layer to form flaps that cooperate with the top layer to hold the film strip therebetween, the construction being such that the inner surface of the top layer adjacent the opening in said layer remains exposed around its entire periphery and acts as a guide for directing the film strip under the flap.

2. A film mount for carrying a film strip comprising a center layer having an opening therein into which the film strip fits closely, a top layer secured to said center layer and having an opening therein smaller than the opening in the center layer whereby the inner surface of the top layer is exposed adjacent the opening in the center layer, the opening in the top layer being dimensioned and positioned precisely to mask off all but the desired image area in the film strip when the film strip is fitted into the opening in the center layer, and a bottom layer secured to said center layer and having an opening therein, the opening in said bottom layer having two of its opposed edges spaced apart a distance equal to the spacing in the corresponding edges in the opening in the center layer whereby the exposed inner surface of the top layer adjacent the opening in the center layer at said two edges remains exposed to act as a guide for the insertion of the film strip, and having its other two opposed edges spaced apart a distance less than the spacing between the corresponding edges in the center layer but greater than the spacing between the edges in the opening in the top layer to form flaps that cooperate with the top layer to hold the film strip therebetween, the construction being such that the inner surface of the top layer adjacent the opening in said layer remains exposed around its entire periphery and acts as a guide for directing the film strip under the flap.

3. A film mount for carrying a film strip comprising a center layer having an opening therein into which the film strip fits closely, a top layer secured to said center layer and having an opening therein smaller than the opening in the center layer whereby the inner surface of the top layer is exposed adjacent the opening in the center layer, the opening in the top layer being dimensioned and positioned precisely to mask off all but the desired image area in the film strip when the film strip is fitted into the opening in the center layer, and a bottom layer secured to said center layer and having an opening therein, the opening in said bottom layer having two of its opposed edges spaced apart a distance equal to the spacing in the corresponding edges in the opening in the center layer whereby the exposed inner surface of the top layer adjacent the opening in the center layer at said two edges remains exposed to act as a guide for the insertion of the film strip, having the central portion of its other two opposed edges spaced apart a distance less than the spacing between the corresponding edges in the opening in the center layer but greater than the spacing between the edges in the opening in the top layer to form flaps that cooperate with the top layer to hold the film strip therebetween and having the end portions of said other two opposed edges spaced apart a distance equal to the spacing between the corresponding edges in the opening in the center layer, the construction being such that the inner surface of the top layer adjacent the opening in said layer remains exposed around its entire periphery and acts as a guide for directing the film strip under the flap.

4. A film mount for carrying a film strip comprising a center layer having an opening therein into which the film strip fits closely, a top layer secured to said center layer and having an opening therein smaller than the opening in the center layer whereby the inner surface of the top layer is exposed adjacent the opening in the center layer, the opening in the top layer being dimensioned and positioned precisely to mask off all but the desired image area in the film strip when the film strip is fitted into the opening in the center layer, and a bottom layer secured to said center layer and having an opening therein, the opening in said bottom layer having two of its opposed edges spaced apart a distance equal to the spacing in the corresponding edges in the opening in the center layer whereby the exposed inner surface of the top layer adjacent the opening in the center layer at said two edges remains exposed to act as a guide for the insertion of the film strip, and having the central 20 to 90% of its other two opposed edges spaced apart a distance less than the spacing between the corresponding edges in the opening in the center layer but greater than the spacing between the edges in the opening in the top layer to form flaps that cooperate with the top layer to hold the film strip therebetween, the construction being such that the inner surface of the top layer adjacent the opening in said layer remains exposed around its entire periphery and acts as a guide for directing the film strip under the flap.

5. A film mount for carrying a film strip comprising a center layer having an opening therein into which the film strip fits closely, a top layer secured to said center layer and having an opening therein smaller than the opening in the center layer whereby the inner surface of the top layer is exposed adjacent the opening in the center layer, the opening in the top layer being dimensioned and positioned precisely to mask off all but the desired image area in the film strip when the film strip is fitted into the opening in the center layer, and a bottom layer secured to said center layer and having an opening therein, the opening in said bottom layer having two of its opposed edges spaced apart a distance equal to the spacing in the corresponding edges in the opening in the center layer whereby the exposed inner surface of the top layer adjacent the opening in the center layer at said two edges remains exposed to act as a guide for the insertion of the film strip, having the central 40 to 75% of its other two opposed edges spaced apart a distance less than the spacing between the corresponding edges in the opening in the center layer but greater than the spacing between the edges in the opening in the top layer to form flaps that cooperate with the top layer to hold the film strip therebetween and having the end portions of said other two opposed edges spaced apart a distance equal to the spacing between the corresponding edges in the opening in the center layer, the construction being such that the inner surface of the top layer adjacent the opening in said layer remains exposed around its entire periphery and acts as a guide for directing the film strip under the flap.

6. A film mount for carrying a film strip comprising a center layer having an opening therein into which the film strip fits closely, a top layer secured to said center layer and having an opening therein smaller than the opening in the center layer whereby the inner surface of the top layer is exposed adjacent the opening in the center layer, the opening in the top layer being dimensioned and positioned precisely to mask off all but the desired image area in the film strip when the film strip is fitted into the opening in the center layer, and a bottom layer secured to said center layer and having an opening therein, the opening in said bottom layer having two of its opposed edges spaced apart a distance equal to the spacing in the corresponding edges in the opening in the center layer whereby the exposed inner surface of the top layer adjacent the opening in the center layer at said two edges remains exposed to act as a guide for the insertion of the film strip, having the central 40 to 75% of its other two opposed edges spaced apart a distance less than the spacing between the corresponding edges in the opening in the center layer but greater than the spacing between the edges in the opening in the top layer to form flaps that cooperate with the top layer to hold the film strip therebetween and having the end portions of said other two opposed edges spaced apart a distance equal to the spacing between the corresponding edges in the opening in the center layer, the construction being such that the inner surface of the top layer adjacent the opening in said layer remains exposed around its entire periphery and acts as a guide for directing the film strip under the flap, the center layer being adhesively secured to the top layer and to the bottom layer throughout its entire area.

References Cited in the file of this patent

UNITED STATES PATENTS

| | | |
|---|---|---|
| 1,285,441 | Snider | Nov. 19, 1918 |
| 1,376,677 | Coufal | May 3, 1921 |
| 1,853,197 | Bosworth | Apr. 12, 1932 |
| 1,904,318 | Lehere | Apr. 18, 1933 |
| 2,014,743 | Metzler et al. | Sept. 17, 1935 |
| 2,161,396 | Wittel | June 6, 1939 |
| 2,164,655 | Kleerup | July 4, 1939 |
| 2,383,465 | Bradford | Aug. 28, 1945 |
| 2,477,470 | Williams | July 26, 1949 |
| 2,739,401 | Balter | Mar. 27, 1956 |